United States Patent [19]

Allen

[11] 4,103,966
[45] Aug. 1, 1978

[54] SADDLE CONSTRUCTION
[75] Inventor: David A. Allen, Glendora, Calif.
[73] Assignee: Huffy Corporation, Miamisburg, Ohio
[21] Appl. No.: 834,275
[22] Filed: Sep. 19, 1977
[51] Int. Cl.² ............................................. B62J 1/00
[52] U.S. Cl. ................................... 297/195; 297/214
[58] Field of Search ............. 297/195, 196, 198, 199, 297/200, 214, 215, 202; 248/188.1, 158

[56] References Cited

U.S. PATENT DOCUMENTS

| 2,244,956 | 6/1941 | Miller et al. | 297/214 |
| 2,300,379 | 10/1942 | Faulhaber | 297/214 X |
| 3,432,204 | 3/1969 | Brilando | 297/215 X |
| 3,622,200 | 11/1971 | Bird | 297/195 |
| 3,682,509 | 8/1972 | Worley | 297/195 |

FOREIGN PATENT DOCUMENTS

| 1,085,986 | 2/1955 | France | 297/214 |
| 5,207 of | 1897 | United Kingdom | 297/195 |
| 463,577 | 10/1975 | U.S.S.R. | 297/195 |

Primary Examiner—Roy D. Frazier
Assistant Examiner—Peter A. Aschenbrenner
Attorney, Agent, or Firm—Biebel, French & Nauman

[57] ABSTRACT

A bicycle saddle construction in which the saddle pan is attached to a one-piece saddle support which underlies and supports the pan. The support includes an upper plate and a downwardly extending skirt, and an intermediate section of the skirt is deformed inwardly to form a downwardly opening socket into which the upper end of a seat post is received and permanently fixed in place by welding.

7 Claims, 3 Drawing Figures

SADDLE CONSTRUCTION

BACKGROUND OF THE INVENTION

In conventional bicycle saddle constructions a seat post clamping bracket is attached to the saddle and the clamp tightened around the seat post by a nut and bolt connection. This construction permits the saddle to be adjusted about an axis extending transversely of the bicycle and perpendicular to the seat post and also facilitates packaging the bicycle for shipment with the saddle removed from the seat post.

However, in addition to the fact that adjustable clamping brackets of this type are multi-piece components which must be preassembled before attachment to the saddle, the clamping force exerted by the clamping bracket on the seat post is often insufficient to hold the saddle in the desired position.

This is particularly true where the saddle is of the elongated type where the saddle length typically may be more than twice as long as it is wide. In fact, with this type of saddle conventional practice is to clamp the saddle to the seat post near the front end of the saddle and use a secondary support, usually in the form of a U-shaped tube, for the rear end of the saddle.

U.S. Pat. No. 2,931,423 discloses a saddle construction in which the seat post is attached directly to the saddle pan. In this construction, a depression is formed in the saddle pan and a slot is provided in the depression to receive an end of a seat post which has been flattened to conform to the sides of the slot. The seat post upper end is positioned in the slot with upper and lower washers disposed above and below the pan and the upper end of the post is then enlarged by cold working to fix the saddle on the seat post. While this construction provides adjustability of the saddle about an axis transverse to the bicycle, it will be seen that again a multi-piece construction is provided and additionally such a construction is not ideally suited for packaging.

U.S. Pat. No. 3,682,509 shows another type of saddle construction wherein a seat post has its upper end flattened, similarly to the above mentioned patent, and is received in a slot formed in a bracket which in turn is attached to the pan of the saddle. Upper and lower washers are also used prior to enlargement of the upper end of the seat post by cold working to fix the support in the desired adjusted position. Again, a multi-piece construction is required and the manner of attaching the seat post to the support precludes continuous supporting contact between the upper surface of the support and the lower surface of the saddle.

SUMMARY OF THE INVENTION

The present invention provides a saddle construction in which a one-piece saddle support is utilized having an upper plate section which conforms to and is attached in supporting relationship to the lower surface of the saddle pan to provide direct support of the pan by the saddle support. The support is provided with a downwardly extending skirt portion which not only provides depth for greater strength, but has a section thereof deformed inwardly to define a downwardly opening seat post receiving socket. The seat post is permanently fixed in the socket by welding, for example, to provide greatly improved support for the saddle without the need of secondary support even where the saddle is of the elongated type having a length more than twice as great as its width.

While one of the three forms of adjustability found in conventional clamping bracket assemblies is lost with the present construction it has been found that adjustment about an axis extending transverse to the bicycle is not of critical importance to the majority of bicycle riders and the loss of this type of adjustability is more than compensated for by the increased rigidity of support and simplicity and inexpensiveness of construction.

Thus, the multi-piece constructions of the prior art are replaced by a single piece construction which provides supporting contact with the saddle pan throughout the extent of the saddle support and eliminates the need for secondary support as well as the often troublesome problem of obtaining sufficient clamping force to hold the bicycle seat in its desired position.

DESCRIPTION OF THE PREFERRED EMBODIMENT

Figure 1:
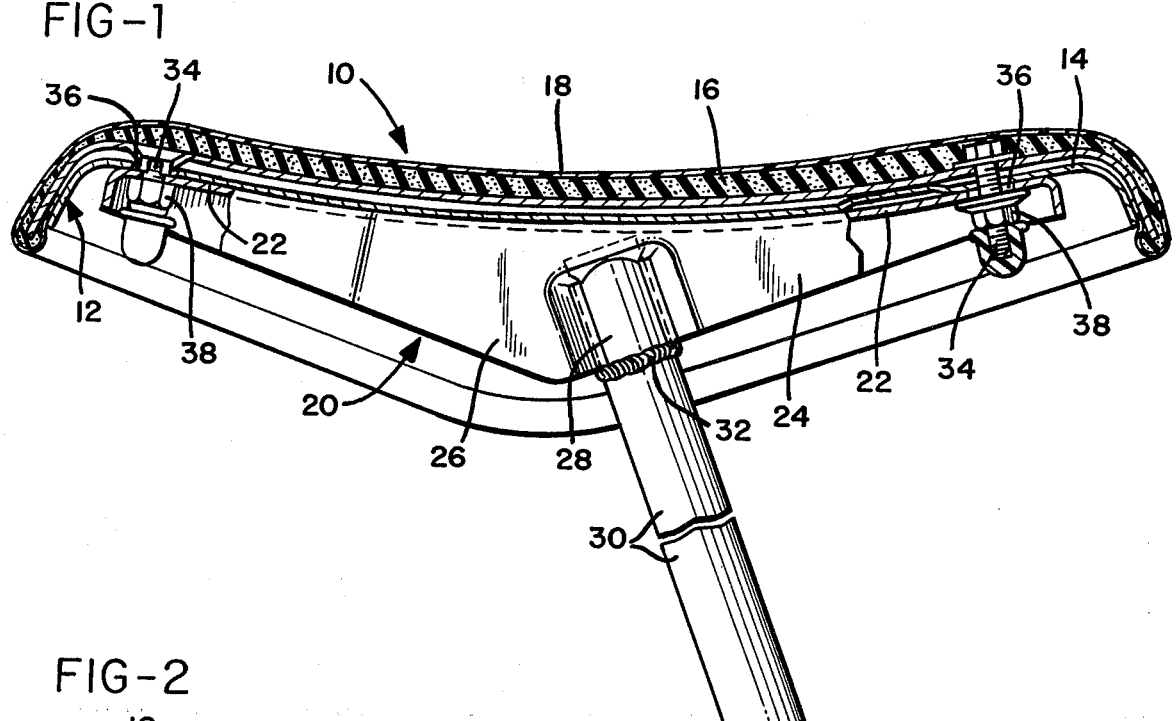
FIG. 1 is a cross sectional view through a saddle construction in accordance with the present invention.
Figure 2:
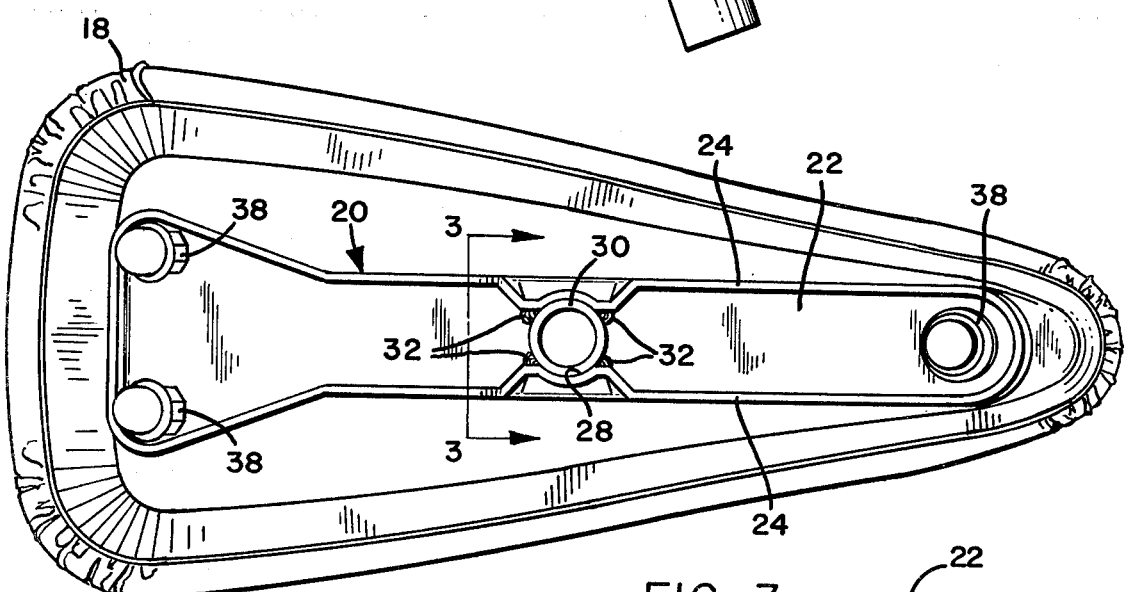
FIG. 2 is a bottom view of the saddle construction.
Figure 3:
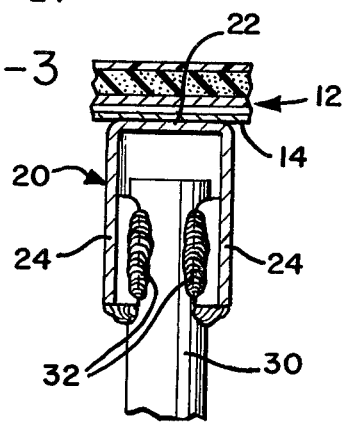
FIG. 3 is a cross sectional view taken on line 3—3 of FIG. 2.

As seen in the drawings a saddle construction 10 includes a saddle pan 12 including a lower plate 14. A layer of upholstery, such as a foamed pad, 16, and a seat cover 18 will normally be applied over the saddle pan.

Saddle support 20 includes an upper plate 22 and a downwardly extending skirt 24. The skirt 24 extends downwardly about the entire periphery of the support and is of substantial depth at an intermediate section 26 thereof. At this point the intermediate section of the skirt portion is deformed inwardly to provide a downwardly opening socket 28 and an upper end of a seat post 30 is received in socket 28 and permanently fixed therein as by welding 32.

It is highly desirable that a bicycle be capable of being shipped partially assembled with the seat removed from the seat post. This is permitted with the saddle construction of the present invention, wherein the saddle pan and attached upholstery are packaged separately from the saddle support-seat post sub-assembly. Upon unpacking the saddle pan is attached to the saddle support by any convenient means such as threaded studs 34 fixed to the saddle pan which are received in openings 36 formed in the upper plate of the saddle support and held in place by nut 38.

While threaded studs and nuts are specifically disclosed herein for purposes of illustration, it will be apparent that any suitable means of attachment may be used in place of members 34 and 38.

This construction provides a simple yet reliable and rigid saddle construction which eliminates many of the drawbacks of prior art assemblies while providing economies in manufacturing costs and assembly.

While the product herein described constitutes a preferred embodiment of the invention, it is to be understood that the invention is not limited to this precise product, and that changes may be made therein without departing from the scope of the invention.

What is claimed is:

1. A saddle construction comprising:
   a saddle pan including a lower plate,
   a one-piece saddle support including an upper plate complementary to said lower plate of said saddle pan throughout substantially the length of said saddle pan, means securing said saddle support to said saddle pan with said upper plate of said support in supporting relationship to said lower plate of said pan, said saddle support further including a dependent skirt portion extending downwardly from said upper plate along opposite sides thereof throughout substantially the length thereof, an intermediate section of said depending skirt portion defining a downwardly opening socket, an elongated seat post, an upper end of said seat post being received in said socket, and means permanently and immovably fixing said upper end of said seat post in said socket with said seat post upper end permanently attached to inner surfaces of said depending skirt portion.

2. The construction of claim 1 wherein:
said skirt portion extends downwardly about the periphery of said upper plate.

3. The construction of claim 1 wherein:
said saddle support is substantially U-shaped in transverse cross-section.

4. The construction of claim 1 wherein:
said saddle pan and saddle support are appreciably greater in length than they are wide.

5. The construction of claim 1 wherein:
said means securing said saddle support to said saddle pan comprises threaded studs and nuts.

6. The construction of claim 1 wherein:
said saddle support comprises the sole support of said saddle pan.

7. A composite saddle construction comprising:
an elongated saddle pan having a length substantially greater than twice the width thereof and including a curved lower plate, an elongated saddle support having a length substantially greater than twice the width thereof and including a curved upper plate and a depending skirt portion extending downwardly from said upper plate about the periphery thereof, said saddle support being substantially U-shaped in transverse cross-section, an intermediate section of said depending skirt portion being inwardly deformed and defining a downwardly opening socket, an elongated tubular seat post, an upper end of said seat post being received in said downwardly opening socket, said upper end of said seat post being welded in place in said downwardly opening socket, and means securing said pan to said support and said support constituting the sole support of said pan.

* * * * *